(12) United States Patent
Harmon et al.

(10) Patent No.: US 12,090,912 B2
(45) Date of Patent: *Sep. 17, 2024

(54) EXTENDABLE CARGO BED FLOOR AND CARGO BED SIDE WALLS

(71) Applicant: Ford Global Technologies, LLC, Dearborn, MI (US)

(72) Inventors: Michael John Harmon, Northville, MI (US); Ryan Mathew Sandor, North Wales, PA (US); Vincent Anthony Chimento, Plymouth, MI (US); Dragan B. Stojkovic, Taylor, MI (US); Jack Marchlewski, Saline, MI (US); Amol Borkar, Nagpur (IN); Christopher Bowser, Dearborn, MI (US); Kirk E. Sanborn, Shelby Township, MI (US); Michelle Lorraine Sacka, Royal Oak, MI (US); Hussain Z. Tajmahal, Detroit, MI (US); Dale F. Jordan, III, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

This patent is subject to a terminal disclaimer.

(21) Appl. No.: 17/673,856

(22) Filed: Feb. 17, 2022

(65) Prior Publication Data

US 2023/0256891 A1   Aug. 17, 2023

(51) Int. Cl.
*B60P 3/40* (2006.01)
*B60R 5/04* (2006.01)
(Continued)

(52) U.S. Cl.
CPC ............. *B60P 3/40* (2013.01); *B60R 5/041* (2013.01); *B60R 11/06* (2013.01); *B60R 13/01* (2013.01); *B62D 33/027* (2013.01); *B62D 33/08* (2013.01)

(58) Field of Classification Search
CPC .......... B62D 33/00273; B62D 33/08; B62D 33/027; B60P 3/40; B60R 2013/015; B60R 13/013; B60R 13/01; B60R 2013/018
See application file for complete search history.

(56) References Cited

U.S. PATENT DOCUMENTS 2,898,146 A * 8/1959 Yudenfreund ..... B62D 25/2054
296/39.1
5,669,654 A * 9/1997 Eilers ...................... B60P 1/003
296/26.11
(Continued)

FOREIGN PATENT DOCUMENTS

DE    102010024216 A1 * 12/2011 ........... B60R 13/013

OTHER PUBLICATIONS

Multi-Flex Tailgate, 2021 Chevy Silverado, retrieved from https://www.chevrolet.com/new-roads/trucks/silverado-multi-lex-tailgate on Jan. 18, 2022.
Canoo, Pickup Truck, retrieved from https://www.canoo.com/pickup/ on Jan. 18, 2022.

*Primary Examiner* — Daniel J Colilla
(74) *Attorney, Agent, or Firm* — Vichit Chea; Carlson, Gaskey & Olds, P.C.

(57) ABSTRACT

A vehicle cargo bed system includes a floor assembly that transitions back-and-forth between a standard floor position and an extended floor position. The floor assembly includes floor sections each having a cargo support surface. The floor sections are folded when the floor assembly is in the standard floor position. The floor sections are unfolded when the floor assembly is in the extended floor position. The assembly further includes first and second side wall assem- (Continued)

blies of the cargo bed that transition back-and-forth between a standard wall position and an extended wall position. The first and second side wall assemblies each include an extendable portion and a fixed portion. The extendable portions extend and retract relative to the respective fixed portions when the first and second side wall assemblies transition back-and-forth between the standard wall position and the extended wall position.

19 Claims, 3 Drawing Sheets

(51) Int. Cl.
*B60R 11/06* (2006.01)
*B60R 13/01* (2006.01)
*B62D 33/027* (2006.01)
*B62D 33/08* (2006.01)

(56) References Cited

U.S. PATENT DOCUMENTS

| | | | |
|---|---|---|---|
| 5,816,637 | A | 10/1998 | Adams et al. |
| 6,648,569 | B2 | 11/2003 | Douglass et al. |
| 6,921,120 | B1 * | 7/2005 | Ervin ................. B60P 3/40 |
| | | | 296/26.05 |
| 7,967,356 | B2 | 6/2011 | Stackpole |
| 8,109,552 | B2 | 2/2012 | Nelson |
| 10,239,567 | B1 | 3/2019 | Parrish |
| 11,904,951 | B2 * | 2/2024 | Harmon ........... B62D 33/0273 |
| 11,904,952 | B2 * | 2/2024 | Harmon .............. B60R 13/01 |
| 2008/0106106 | A1 | 5/2008 | Lavoie |
| 2012/0228893 | A1 | 9/2012 | Lu et al. |
| 2015/0225024 | A1 | 8/2015 | Newberry |
| 2016/0214522 | A1 * | 7/2016 | Marshall ............. B60P 7/0884 |
| 2016/0236724 | A1 * | 8/2016 | Borges Filho ..... B62D 33/0273 |
| 2020/0361389 | A1 * | 11/2020 | Leitner ................. B60R 3/02 |
| 2021/0188368 | A1 | 6/2021 | Williams et al. |
| 2021/0362788 | A1 * | 11/2021 | Singer ................. B62D 33/08 |

* cited by examiner

EXTENDABLE CARGO BED FLOOR AND CARGO BED SIDE WALLS

TECHNICAL FIELD

This disclosure relates generally to a cargo bed of a vehicle and, more particularly, to a cargo bed that can be extended.

BACKGROUND

Some vehicles, such as pickup trucks, include a cargo bed. Users utilize cargo beds to carry various types of cargo. The cargo bed can be located behind a passenger compartment of the vehicle. A tailgate can enclose an aft end of the cargo bed.

SUMMARY

In some aspects, the techniques described herein relate to a cargo bed system, including: a floor assembly for a cargo bed of a vehicle, the floor assembly configured to transition back-and-forth between a standard floor position and an extended floor position, the floor assembly including a plurality of floor sections each having a cargo support surface, the floor sections folded when the floor assembly is in the standard floor position, the floor sections unfolded when the floor assembly is in the extended floor position; and first and second side wall assemblies of the cargo bed, the first and second side wall assemblies each configured to transition back-and-forth between a standard wall position and an extended wall position, the first and second side wall assemblies each including an extendable portion and a fixed portion, the extendable portions extending and retracting relative to the respective fixed portions when the first and second side wall assemblies transition back-and-forth between the standard wall position and the extended wall position.

In some aspects, the techniques described herein relate to a cargo bed system, wherein the extendable portion of at least the first wall includes a cargo holding surface.

In some aspects, the techniques described herein relate to a cargo bed system, wherein cargo coupled to the cargo holding surface of the first wall is received within the fixed portion of the first wall when the first side wall assembly is in the standard wall position.

In some aspects, the techniques described herein relate to a cargo bed system, further including taillights of the extendable portions, the taillights extending and retracting with the extendable portions relative to the fixed portion.

In some aspects, the techniques described herein relate to a cargo bed system, wherein the extendable portion of the first wall and the extendable portion of the second wall are configured to, when extended, provide respective side walls of an extended area of the cargo bed.

In some aspects, the techniques described herein relate to a cargo bed system, further including a first taillight on the extendable portion of the first wall, and a second taillight on the extendable portion of the second wall, the first taillight extending and retracting with the extendable portion of the first wall, the second taillight extending and retracting with the extendable portion of the second wall.

In some aspects, the techniques described herein relate to a cargo bed system, wherein the first side wall is a driver side wall, and the second side wall is a passenger side wall.

In some aspects, the techniques described herein relate to a cargo bed system, wherein the extendable portion of the first side wall is telescopically received within the fixed portion of the first side wall when the first side wall is in the standard wall position, wherein the extendable portion of the first side wall is telescopically received within the fixed portion of the first side wall when the first side wall is in the standard wall position.

In some aspects, the techniques described herein relate to a cargo bed system, further including a grab handle that can be actuated to release the extendable portion of the first side wall assembly such that the extendable portion of the first side wall can extend relative to the fixed portion of the first wall.

In some aspects, the techniques described herein relate to a cargo bed system, wherein the floor assembly is laterally widened at an aft end of the floor assembly, the laterally widened portions extending outboard beneath the first and second wall assemblies when the floor assembly is in the standard floor position.

In some aspects, the techniques described herein relate to a cargo bed system, wherein an outer profile of the floor assembly has a "T" shape.

In some aspects, the techniques described herein relate to a cargo bed system, wherein the plurality of floor sections includes a plurality of pivotable floor sections that are folded against one another when the floor assembly is in the standard floor position.

In some aspects, the techniques described herein relate to a cargo bed system, wherein the plurality of floor sections further includes at least one slidable floor section that slides when the floor assembly is transitioned back-and-forth between the standard floor position and the extended floor position, the at least one slidable floor section sliding without pivoting.

In some aspects, the techniques described herein relate to a cargo bed system, wherein the plurality of pivotable floor sections are stacked against one another and stacked against a front wall of the cargo bed when the floor assembly is in the standard floor position.

In some aspects, the techniques described herein relate to a cargo bed system, further including a tailgate having a first tailgate door and a second tailgate door, the first tailgate door configured to pivot about a first vertically extending axis back-and-forth between a closed position and a fully open position, the second tailgate door configured to pivot about a second vertically extending axis back-and-forth between a closed position and a fully open position.

In some aspects, the techniques described herein relate to a cargo bed system, further including at least one step deployable from beneath the cargo bed.

In some aspects, the techniques described herein relate to a cargo bed adjustment method, including: transitioning a floor assembly for a cargo bed of a vehicle from a standard floor position and an extended floor position by unfolding a plurality of floor sections of the floor assembly; and transitioning first and second side wall assemblies of the cargo bed from a standard wall position to an extended wall position by extending an extendable portions of the first and second side wall assemblies relative to respective fixed portions of the first and second side wall assemblies.

In some aspects, the techniques described herein relate to a method, wherein the plurality of floor sections are folded against a front wall of the cargo bed when the floor assembly is in the standard floor position, wherein the plurality of floor sections are unfolded when the floor assembly is in the extended floor position.

In some aspects, the techniques described herein relate to a method, wherein, when the cargo bed is in an extended bed position, the floor assembly is in the extended floor position, and the first and second side wall assemblies are each in the extended wall position, the extendable portions of the first and second side wall assemblies providing respective side walls of an extended area of the cargo bed.

In some aspects, the techniques described herein relate to a method, wherein a first taillight is mounted to the extendable portion of the first side wall such that the first taillight extends and retracts with the extendable portion of the first side wall, wherein a second taillight is mounted to the extendable portion of the first side wall such that the second taillight extends and retracts with the extendable portion of the first side wall.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle having a cargo bed that can be extended and retracted. Side wall assemblies extend to extend the cargo bed and retract to retract the cargo bed. A floor of the cargo bed can move between a folded position and an unfolded position when the cargo bed is extended and retracted.

Figure 1:
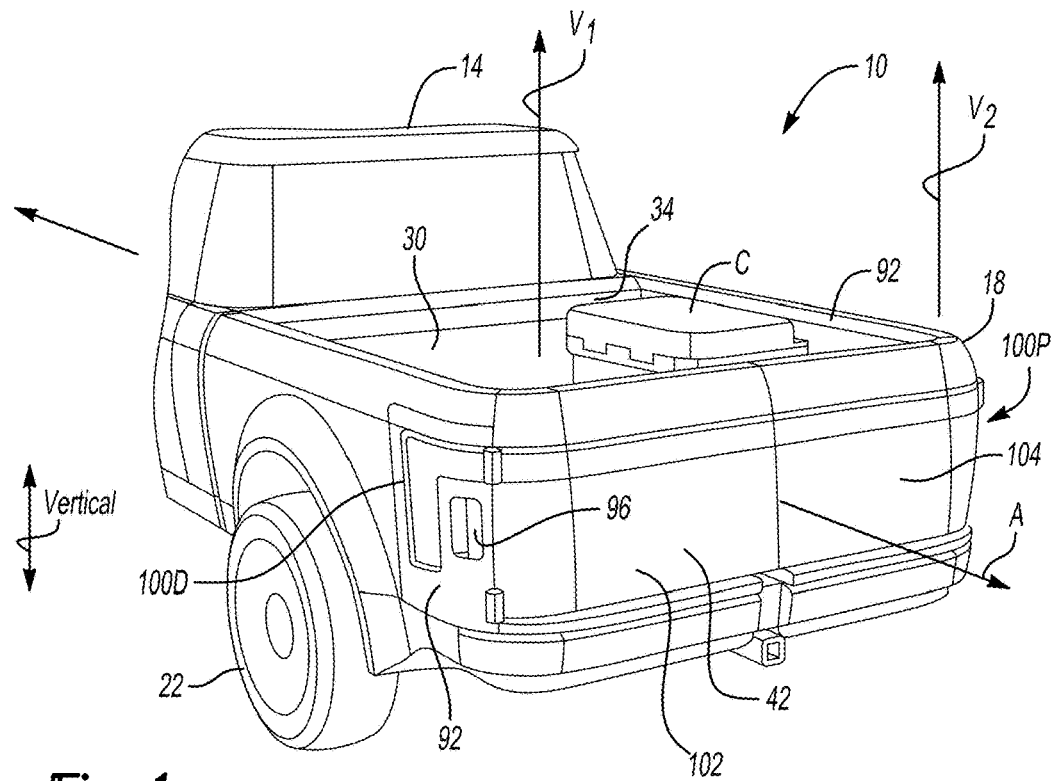
FIG. 1 illustrates a vehicle having a cargo bed with the cargo bed in a standard bed position.

With reference to FIGS. 1, a vehicle 10 includes a passenger compartment 14 and a cargo bed 18 that is aft the passenger compartment 14 along a longitudinal axis A of the vehicle 10.

In the exemplary embodiment, the vehicle 10 is a pickup truck. The vehicle 10 could be another type of vehicle in another example, such as a car, van, sport utility vehicle, etc. The vehicle 10 has a unibody architecture. In another embodiment, the vehicle 10 could have a body-on-frame architecture.

The example vehicle 10 is an electrified vehicle. In particular, the vehicle 10 is a battery electric vehicle. In another example, the vehicle 10 could be another type of electrified vehicle, such as a plug-in hybrid electric vehicle (PHEV), or a conventional vehicle.

The example vehicle 10 includes an electrified powertrain capable of applying a torque from an electric machine (e.g., an electric motor) to drive a pair of drive wheels 22. The vehicle 10 can include a traction battery pack, which powers the electric machine and, potentially, other electrical loads of the vehicle 10. The powertrain of the vehicle 10 may electrically propel the drive wheels 22 either with or without the assistance of an internal combustion engine.

FIG. 1 shows the cargo bed 18 in a standard position where the cargo bed 18 can hold cargo C. The cargo bed 18 can be transitioned from the standard bed position of FIG. 1 to the extended bed position of FIG. 2. In the extended bed position, the cargo bed 18 can transport cargo C', which is larger than the cargo C shown in FIG. 1. The cargo C' may be too large to comfortably fit in the cargo bed 18 when the cargo bed 18 is in the standard bed position, which causes the user to transition the cargo bed 18 to the extended bed position.

Generally, the cargo bed 18 includes a floor assembly 30, a front wall 34, a first side wall assembly 38D, a second side wall assembly 38P, and a tailgate assembly 42. The floor assembly 30, the first side wall assembly 38D, and the second side wall assembly 38P provide parts of a cargo bed system enabling the cargo bed 18 to be transitioned back-and-forth between the standard bed position of FIG. 1 and the extended bed position of FIG. 2.

As to the floor assembly 30, when the cargo bed 18 is in the standard bed position, the floor assembly 30 is in a standard floor position. When the cargo bed 18 is in the extended bed position, the floor assembly 30 is in an extended floor position.

The floor assembly 30 includes a plurality of floor sections 50 each having a cargo support surface 54. When the floor sections 50 are used to support the cargo C or C', the cargo support surfaces 54 face vertically upwards and directly support and interface with the cargo C or C'. Vertical, for purposes of this disclosure, is with reference to ground and a general orientation of the vehicle 10 during ordinary operation.

In this example, the floor sections 50 of the floor assembly 30 include two pivotable floor sections 58, and one slidable floor section 62. The two pivotable floor sections 58 include a front pivotable floor section 58F and an aft pivotable floor section 58A. More than two pivotable floor sections 58 could be used in other examples. More than two pivotable floor sections 58 are not used in this example, which reduces overall part complexity.

The front pivotable floor section 58F is disposed in front of the aft pivotable floor section 58A along the longitudinal axis A of the vehicle 10. The front pivotable floor section 58F and the aft pivotable floor section 58A each include a forward edge 66 and a trailing edge 70.

In this example, the forward edge 66 of the front pivotable floor section 58F pivotably connects to the front wall 34 of the cargo bed 18. The trailing edge 70 of the front pivotable floor section 58F is pivotably connected to the forward edge 66 of the aft pivotable floor section 58A. The trailing edge 70 of the aft pivotable floor section 58A is pivotably connected to the slidable floor section 62. Floor hinge assemblies 74, for example, could be used to pivotably connect the front pivotable floor section 58F and the aft pivotable floor section 58A to the other structures.

When the cargo bed 18 is in the standard bed position, the floor assembly 30 is in a standard floor position. In the standard floor position, the front pivotable floor section 58F and the aft pivotable floor section 58A are pivoted to a position where the front pivotable floor section 58F and the aft pivotable floor section 58A are folded together.

In this example, when the cargo bed 18 is in the standard bed position, the front pivotable floor section 58F and the aft pivotable floor section 58A are folded against one another, and folded against the front wall 34. In particular, the front pivotable floor section 58F is stacked against the front wall 34, and the aft pivotable floor section 58A is stacked against the front pivotable floor section 58F. The front pivotable floor section 58F and the aft pivotable floor section 58A can be received within a recess 80 (FIG. 2) of the front wall 34 when folded in this way.

When the cargo bed 18 is in the standard bed position, the cargo support surface 54 of the front pivotable floor section 58F faces forward along the longitudinal axis A of the vehicle 10, and the cargo support surface 54 of the aft pivotable floor section 58A faces aft along the longitudinal axis A.

The slidable floor section 62 slides when transitioning the floor assembly 30 back-and-forth between the standard floor position and the extended floor position. In this example, the slidable floor section 62 slides without pivoting when the floor assembly 30 is transitioned back-and-forth between the standard floor position and the extended floor position.

When the cargo bed 18 is in the extended bed position, the floor assembly 30 is transitioned to the extended floor position. In the extended floor position, the front pivotable floor section 58F and the aft pivotable floor section 58A are pivoted to a position where the front pivotable floor section 58F and the aft pivotable floor section 58A are unfolded. The front pivotable floor section 58F and the aft pivotable floor section 58A fold and unfold like an accordion.

In the extended floor position, the cargo support surfaces 54 of the front pivotable floor section 58F and the aft pivotable floor section 58A face upwards. In the extended floor position, the cargo support surfaces 54 of the floor sections 50 of the floor assembly 30 all face vertically upward. Also, the floor sections 50 are all disposed next to each other along the longitudinal axis A of the vehicle 10.

When in the extended bed position, the slidable floor section 62 is slid rearward such that an extended area 82 of the slidable floor section 62 extends rearward past a rear bumper 84 of the vehicle 10.

Figure 2:
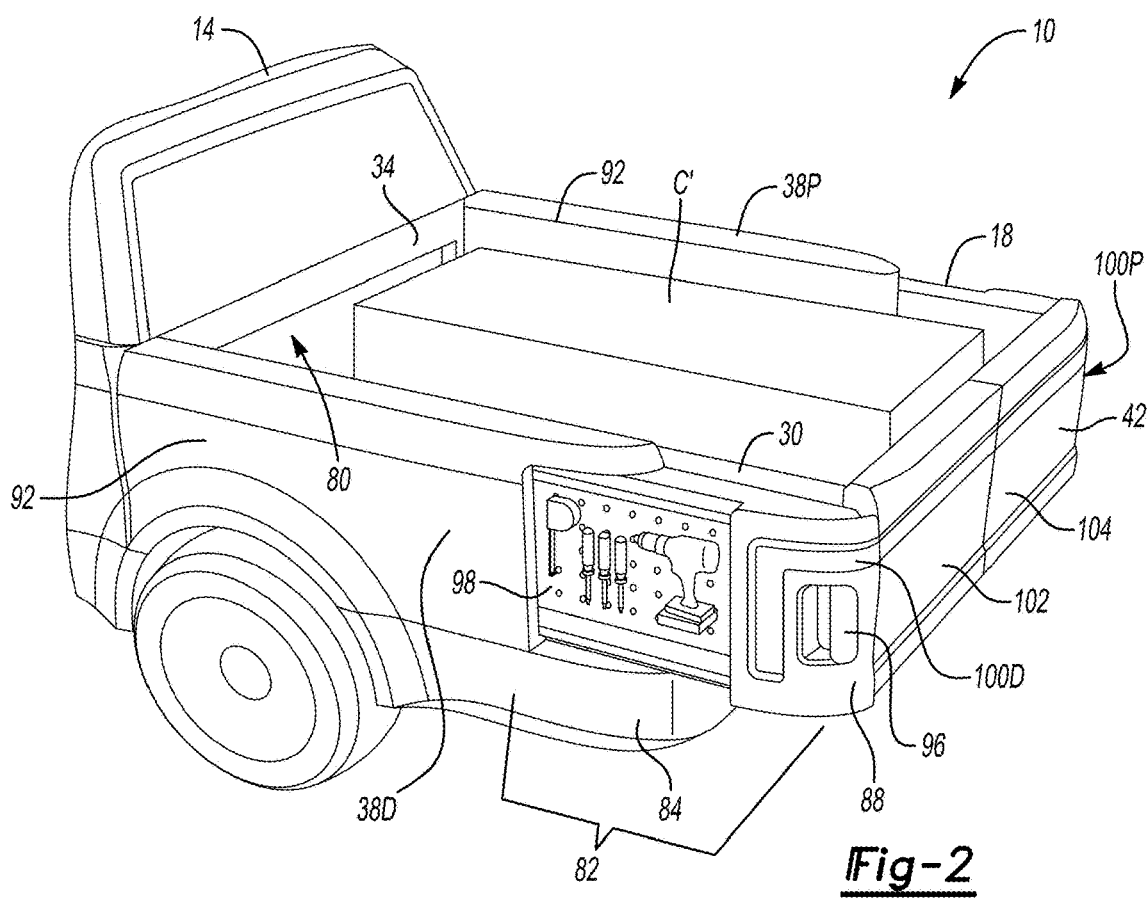
FIG. 2 illustrates the vehicle of FIG. 1 with the cargo bed in an extended bed position.
Figure 3:
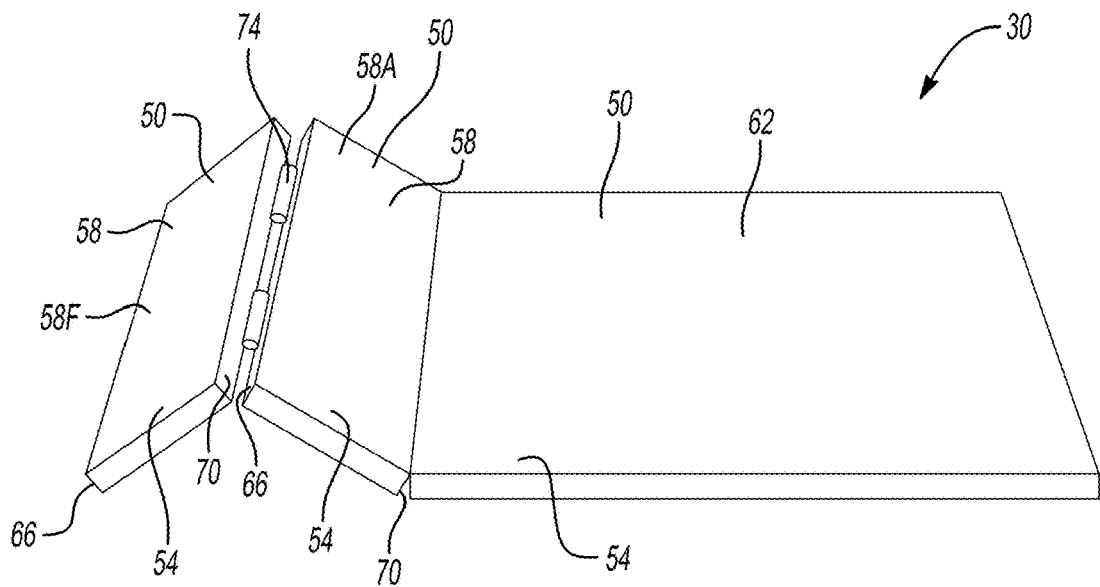
FIG. 3 illustrates a floor of the cargo bed of FIG. 1.

The first side wall assembly 38D and the second side wall assembly 38P are each configured to transition back-and-forth between a standard wall position (FIGS. 1 and 2) and an extended wall position (FIG. 3). The first side wall assembly 38D and the second side wall assembly 38P each include an extendable portion 88 and a fixed portion 92. The extendable portions 88 can extend and retract relative to the respective fixed portions 92. The extendable portions 88 are retracted when the cargo bed 18 is in the standard bed position. The extendable portions 88 are extended when the cargo bed 18 is in the extended bed position.

In this example, the extendable portions 88 are telescopically received within the respective fixed portions 92. Actuators could be used to move the extendible portions 88 back-and-forth between the extended and retracted positions. The actuators could be screw-driven linear actuators, for example. The actuators could extend and retract in response to command from a button on the vehicle 10 or an input from a handheld device, such as a smartphone. Instead, or additionally, a user could manually move the extendable portions back-and-forth between the extended and retracted positions.

In this example, the extendable portions 88 of the first and second side wall assemblies 38D, 38P, when extended, provide respective side walls of the extended area 82 of the cargo bed 18 when the cargo bed 18 is in the extended bed position.

In the exemplary embodiment, a grab handle 96 can be actuated to release the extendable portion 88 of the first side wall assembly 38D so that the extendable portion 88 of the first side wall assembly 38D can extend relative to the fixed portion 92. A grab handle can additionally or instead be included within the extendable portion 88 of the second side wall assembly 38P.

The extendable portions 88 can each include at least one cargo holding surface 98. Tools and other accessories can be coupled to the cargo holding surface 98. The tools and other accessories could simply rest on the cargo holding surface 98 or could hang from the cargo holding surface 98.

The tools and other accessories coupled to the cargo holding surface 98 can be accessed, in this example, by extending the extendable portions 88. When the extendable portions 88 are retracted, the tools accessories are received and secured within the respective one of the side wall assemblies 38D, 38P.

When the extendable portions 88 are extended, a cover could be used to conceal and secure tools and other accessories coupled to the cargo holding surface 98. Instead or additionally, the tools and other accessories could couple to a cargo holding surface of the extendable portions 88 that faces into the cargo bed 18. A tonneau cover could then cover the cargo bed 18 to secure those tools and other accessories.

The example first side wall assembly 38D and second side wall assembly 38P thus include storage areas that can be accessed by extending the respective extendable wall section 50. The extendable wall sections 50 could be locked when retracted to prevent unauthorized access to the tools and other accessories coupled to the cargo holding surface 100.

A first taillight 100D is part of the extendable portion 88 of the first side wall assembly 38D. A second taillight 100P is part of the extendable portion 88 of the second side wall assembly 38P. The first and second taillights 100D, 100P extend and retract with the corresponding extendable portions 88 of the first and second side wall assemblies 38D, 38P. Because the first and second taillights 100D, 100P extend rearward and are operational when the extendable portions 88 are extended, there may be no need to add additional lighting when operating the vehicle 10 with the cargo bed 18 in the extended bed position. Sensors of the vehicle 10 could also be included within the extendable portions 88. The sensors can operate when the extendable portions 88 are in the extended position and when the extendable portions 88 are in the retracted position so that redundant sensors are not required.

The tailgate assembly 42 of the example vehicle 10 is a split tailgate having a first tailgate door 102 and a second tailgate door 104. The first tailgate door 102 is configured to pivot about a first vertically extending axis $V_1$ back-and-forth between a closed position and a fully open position. The second tailgate door 104 is configured to pivot about a second vertically extending axis $V_2$ back-and-forth between a closed position and a fully open position. The first tailgate door 102 and the second tailgate door 104 can additionally pivot together about a horizontally extending axis.

In this example, the first tailgate door 102 is on a driver side of the vehicle 10, and the second tailgate door 104 is on the passenger side of the vehicle 10. The first tailgate door 102 and the second tailgate door 104 are similarly sized in this example. The exemplary first tailgate door 102 and the second tailgate door 104 each account for about fifty percent of the tailgate assembly 42.

Figure 4:
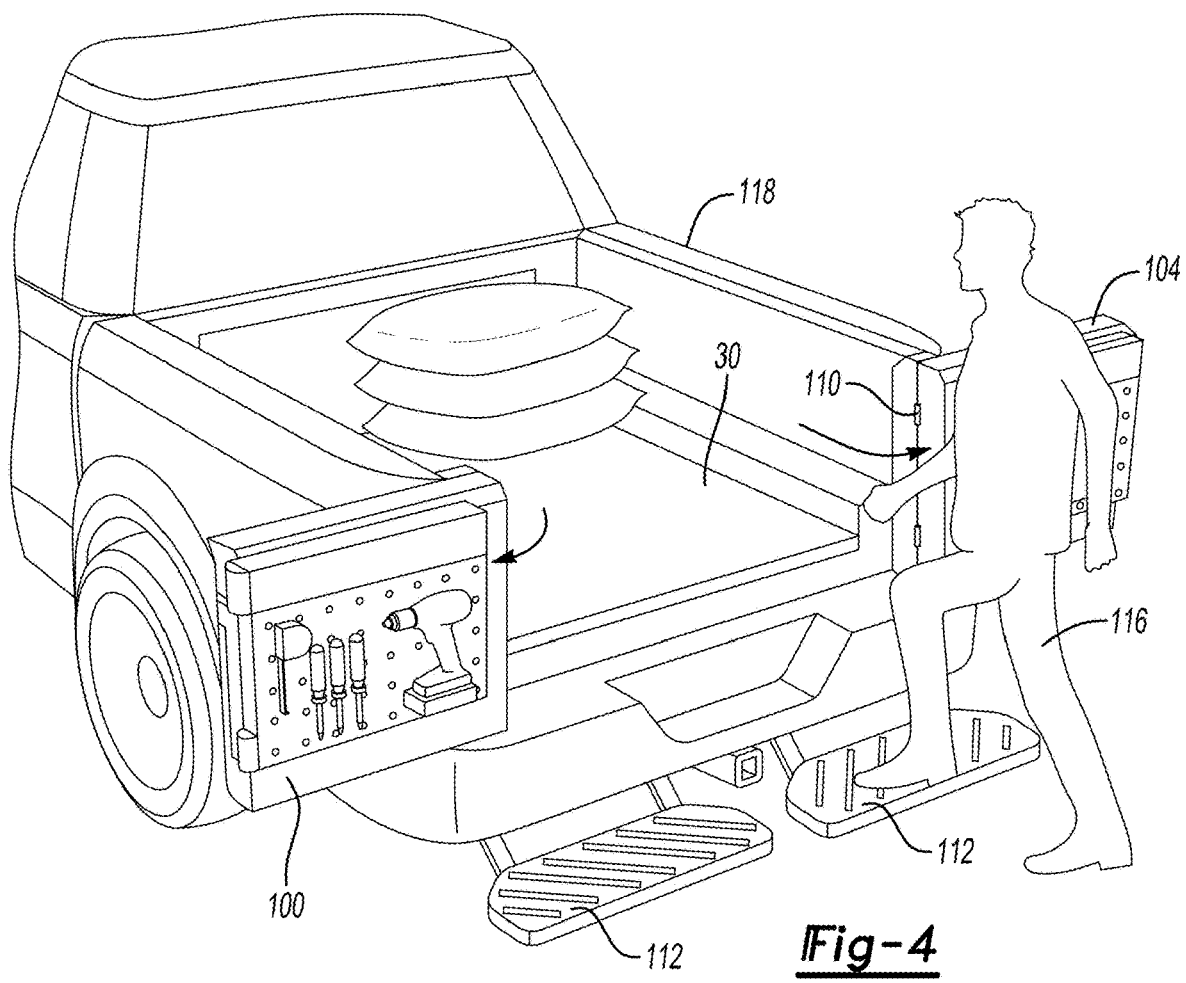
FIG. 4 illustrates the vehicle of FIG. 1 with a first and second tailgate door of a tailgate in fully open positions.

FIG. 4 shows the first tailgate door 102 and the second tailgate door 104 each in a fully open position. Door hinge assemblies 110 could be used, for example, to pivotably connect the first tailgate door 102 and the second tailgate door 104 to the surrounding structures to enable the first tailgate door 100 and the second tailgate door 108 to pivot back and for the between the closed position of FIG. 1 and the fully open position of FIG. 4. Tools, accessories, gear, etc., can be mounted on the first tailgate door 102 and the second tailgate door 104 as shown.

In the exemplary embodiment, the vehicle 10 includes two steps 112 that can pivot out from beneath the cargo bed 18 of the vehicle 10 to the position of FIG. 4. A user 116 can use the steps 112 to help enter and exit the cargo bed 18. The steps 112 are shown in a deployed position in FIG. 4. When not needed, the steps 112 can be retracted beneath the vehicle 10 in a stowed position.

To adjust the cargo bed 18 from the standard bed position of FIG. 1 to the extended bed position of FIG. 2, the extendable portions 88 of the first side wall assembly 38D and the second side wall assembly 38P are extended. This can be in response to the 116 releasing the grab handle 96 and initiating an actuator to start moving the extendable portions 88.

Moving the extendable portions 88 moves the tailgate assembly 42 rearward and pulls the slidable floor section 62 rearward, which unfolds and pulls the aft pivotable floor section 58A and the front pivotable floor section 58F. The forward pivotable floor section 58F and the aft pivotable floor section 58A unfold and pivot until the cargo support surface 54 of the front pivotable floor section 58F and the cargo support surface 54 of the aft pivotable floor section 58A face upward as shown in FIG. 2.

Figure 5:
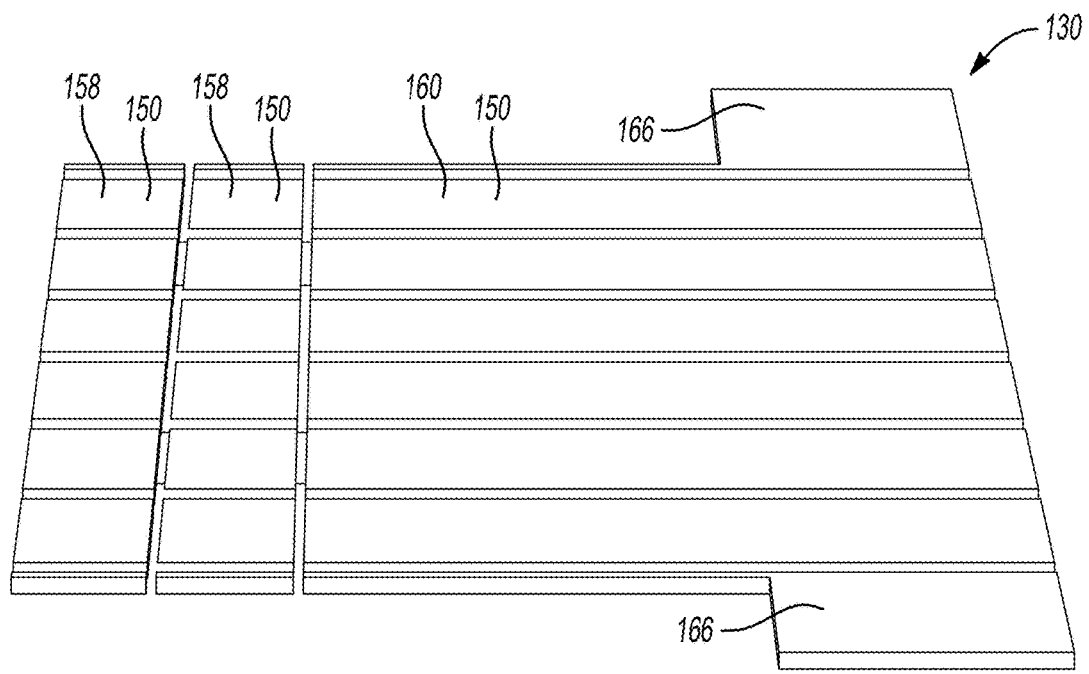
FIG. 5 illustrates a floor of a cargo bed according to another exemplary aspect of the present disclosure.
Figure 6:
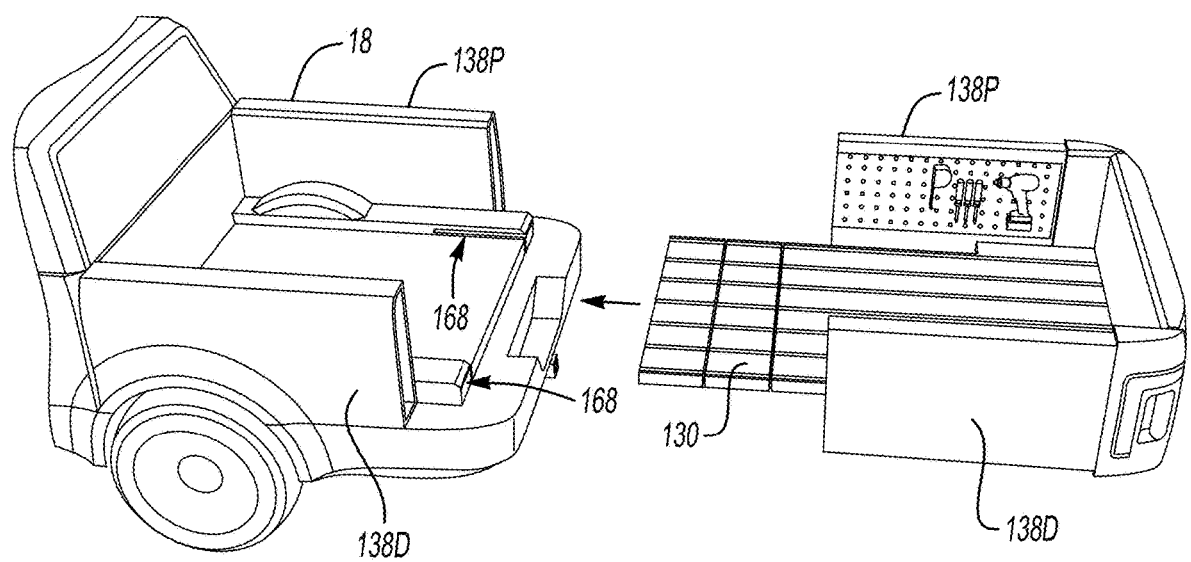
FIG. 6 illustrates a partially expanded view of a vehicle incorporating the floor of FIG. 5.

With reference to FIGS. 5 and 6, another example vehicle 10 includes a floor assembly 130. In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

The floor assembly 130 has, like the floor assembly 30 of FIG. 3, a plurality of floor sections 150 including two pivotable floor sections 158, and one slidable floor section 162. The slidable floor section 162 has a "T" shaped outer profile. In particular, the slidable floor section 162 is laterally widened at an aft end of the floor assembly 130 by two flanges 166—one projecting laterally outward on the driver side and the other projecting laterally outward on the driver side.

When the cargo bed 18 is in the standard bed position, the flanges 166 are received within corresponding grooves 168. One of the grooves 168 is below the first side wall assembly 138D and the other groove 168 is below the second side wall assembly 138P. When the flanges 166 are received within the grooves 168, the flanges 166 are extending outboard beneath the first and second wall assemblies 138P.

When the cargo bed 18 is in the extended bed position, the flanges 166 can fill gaps vertically beneath extensions 188 of the driver side wall assembly 138D and the passenger side wall assembly 138P. This can help to contain material within the cargo bed 18 and can provide a larger worksurface for the user 116 if the tailgate doors 102 and 104 are opened with the floor assembly.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed system, comprising:
a floor assembly for a cargo bed of a vehicle, the floor assembly configured to transition back-and-forth between a standard floor position and an extended floor position, the floor assembly including a plurality of floor sections each having a cargo support surface, the floor sections folded when the floor assembly is in the standard floor position, the floor sections unfolded when the floor assembly is in the extended floor position; and
first and second side wall assemblies of the cargo bed, the first and second side wall assemblies each configured to transition back-and-forth between a standard wall position and an extended wall position, the first and second side wall assemblies each including an extendable portion and a fixed portion, the extendable portions extending and retracting relative to the respective fixed portions when the first and second side wall assemblies transition back-and-forth between the standard wall position and the extended wall position, wherein the extendable portion of at least the first wall includes a cargo holding surface.

2. The cargo bed system of claim 1, wherein cargo coupled to the cargo holding surface of the first wall is received within the fixed portion of the first wall when the first side wall assembly is in the standard wall position.

3. The cargo bed system of claim 1, further comprising taillights of the extendable portions, the taillights extending and retracting with the extendable portions relative to the respective fixed portion.

4. The cargo bed system of claim 1, wherein the extendable portion of the first wall and the extendable portion of the second wall are configured to, when extended, provide respective side walls of an extended area of the cargo bed.

5. The cargo bed system of claim 1, further comprising a first taillight on the extendable portion of the first wall, and a second taillight on the extendable portion of the second wall, the first taillight extending and retracting with the extendable portion of the first wall, the second taillight extending and retracting with the extendable portion of the second wall.

6. The cargo bed system of claim 1, wherein the first side wall is a driver side wall, and the second side wall is a passenger side wall.

7. The cargo bed system of claim 1, wherein the extendable portion of the first side wall is telescopically received within the fixed portion of the first side wall when the first side wall is in the standard wall position, wherein the extendable portion of the second side wall is telescopically received within the fixed portion of the second side wall when the second side wall is in the standard wall position.

8. The cargo bed system of claim 1, further comprising a grab handle that can be actuated to release the extendable portion of the first side wall assembly such that the extendable portion of the first side wall can extend relative to the fixed portion of the first wall.

9. The cargo bed system of claim 1, wherein the floor assembly is laterally widened at an aft end of the floor assembly to provide opposing laterally widened portions that extend outboard toward the first or the second wall assembly when the floor assembly is in the standard floor position.

10. The cargo bed system of claim 9, wherein an outer profile of the floor assembly has a "T" shape.

11. The cargo bed system of claim 1, wherein the plurality of floor sections includes a plurality of pivotable floor sections that are folded against one another when the floor assembly is in the standard floor position.

12. The cargo bed system of claim 11, wherein the plurality of floor sections further includes at least one slidable floor section that slides when the floor assembly is transitioned back-and-forth between the standard floor position and the extended floor position, the at least one slidable floor section sliding without pivoting.

13. The cargo bed system of claim 11, wherein the plurality of pivotable floor sections are stacked against one another and stacked against a front wall of the cargo bed when the floor assembly is in the standard floor position.

14. The cargo bed system of claim 1, further comprising a tailgate having a first tailgate door and a second tailgate door, the first tailgate door configured to pivot about a first vertically extending axis back-and-forth between a closed position and a fully open position, the second tailgate door configured to pivot about a second vertically extending axis back-and-forth between a closed position and a fully open position.

15. The cargo bed system of claim 1, further comprising at least one step deployable from beneath the cargo bed.

16. A cargo bed adjustment method, comprising:
transitioning a floor assembly for a cargo bed of a vehicle from a standard floor position and an extended floor position by unfolding a plurality of floor sections of the floor assembly; and
transitioning first and second side wall assemblies of the cargo bed from a standard wall position to an extended wall position by extending extendable portions of the first and second side wall assemblies relative to respective fixed portions of the first and second side wall assemblies, wherein transitioning the first and second wall assemblies from the standard wall position to the extended wall position causes the floor assembly to transition from the standard floor position to the extended floor position.

17. The method of claim 16, wherein the plurality of floor sections are folded against a front wall of the cargo bed when the floor assembly is in the standard floor position, wherein the plurality of floor sections are unfolded when the floor assembly is in the extended floor position.

18. The method of claim 16, wherein, when the cargo bed is in an extended bed position, the floor assembly is in the extended floor position, and the first and second side wall assemblies are each in the extended wall position, the extendable portions of the first and second side wall assemblies providing respective side walls of an extended area of the cargo bed.

19. The method of claim 16, wherein a first taillight is mounted to the extendable portion of the first side wall such that the first taillight extends and retracts with the extendable portion of the first side wall, wherein a second taillight is mounted to the extendable portion of the second side wall such that the second taillight extends and retracts with the extendable portion of the second side wall.

* * * * *